(12) United States Patent
Unterberger et al.

(10) Patent No.: US 6,565,685 B2
(45) Date of Patent: May 20, 2003

(54) PROCESS FOR MANUFACTURE OF AN OPTICAL RIBBON CONDUCTOR FROM SEVERAL OPTICAL CONDUCTORS

(75) Inventors: Siegfried Unterberger, Coburg (DE); Dieter Kundis, Lautertal (DE); Michael Ellwanger, Hickory, NC (US)

(73) Assignee: CCS Technology, Inc., Wilmington, DE (US)

( * ) Notice: Subject to any disclaimer, the term of this patent is extended or adjusted under 35 U.S.C. 154(b) by 108 days.

(21) Appl. No.: 09/860,050

(22) Filed: May 17, 2001

(65) Prior Publication Data

US 2002/0007916 A1 Jan. 24, 2002

(30) Foreign Application Priority Data

May 19, 2000 (DE) .......................... 100 24 837

(51) Int. Cl.$^7$ .............................. G02B 6/44; B32B 31/00
(52) U.S. Cl. .................... 156/18; 156/166; 385/114; 427/163.3
(58) Field of Search ................ 156/180, 166; 385/114; 427/163.2

(56) References Cited

U.S. PATENT DOCUMENTS

| 4,575,437 | A |   | 3/1986 | Kojima et al. |
| 4,720,165 | A |   | 1/1988 | Tokuda et al. |
| 4,900,126 | A |   | 2/1990 | Jackson et al. |
| 5,485,539 | A | * | 1/1996 | Mills ........................ 385/114 |
| 5,928,712 | A |   | 7/1999 | Unterberger et al. |
| 5,982,968 | A |   | 11/1999 | Stulpin |

FOREIGN PATENT DOCUMENTS

| DE | 35 26 823 A1 | 2/1987 |   |
| DE | 38 29 428 A1 | 3/1990 |   |
| DE | 41 26 860 A1 | 2/1993 |   |
| DE | 19 70 2106 A1 | 10/1997 |   |
| EP | 0 116 140 A1 | 8/1984 |   |
| EP | 0 262 340 A2 | 4/1988 |   |
| EP | 0 293 886 B1 | 12/1988 |   |
| EP | 0 501 339 B1 | 9/1992 |   |
| EP | 0 614 099 A2 | 9/1994 |   |
| EP | 660148 A1 * | 6/1995 | ............ G02B/6/44 |
| EP | 0 950 908 A2 | 10/1999 |   |

* cited by examiner

Primary Examiner—Jeff H. Aftergut

(57) ABSTRACT

In a process for the manufacture of an optical ribbon conductor from several optical conductors, the outer circumference of at least one optical conductor (LW2) is coated with a first coating material (FC). The optical conductor (LW2) and at least another optical conductor (LW3) are arranged adjacent to each other in their longitudinal direction (OA) and are formed into a ribbon conductor and coated with a second coating (BC), so that a gap (S) results between the two adjacent optical conductors which is not occupied by an optical conductor. The position of at least one of the optical conductors (LW2, LW3) within the ribbon conductor (LWB) is controlled relative to the coating thickness (D) of the second coating material (BC). The second coating material (BC) can then dependably be removed after manufacture without also removing the first coating material (FC).

13 Claims, 2 Drawing Sheets

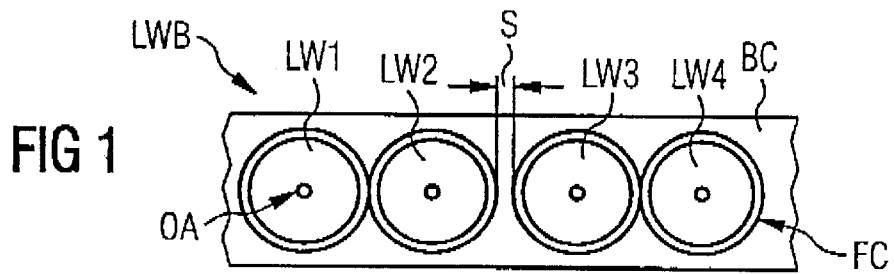
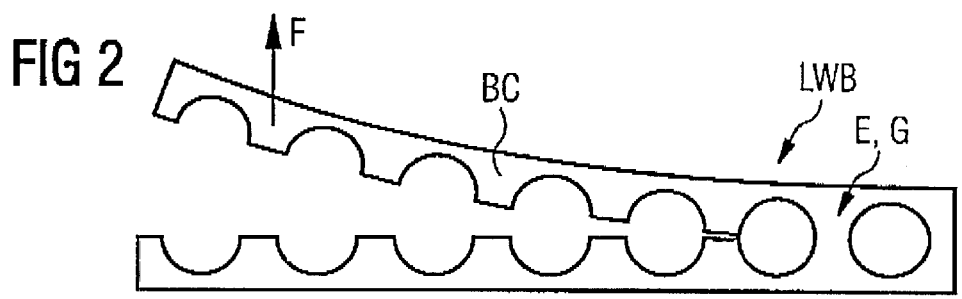
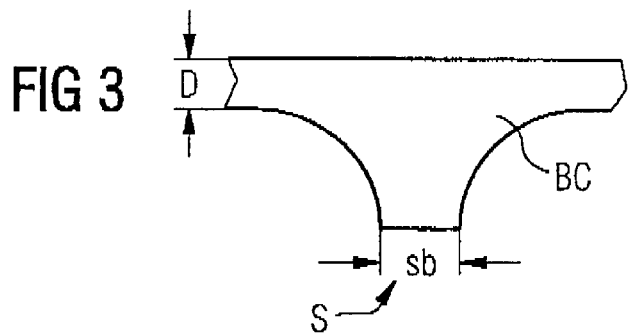
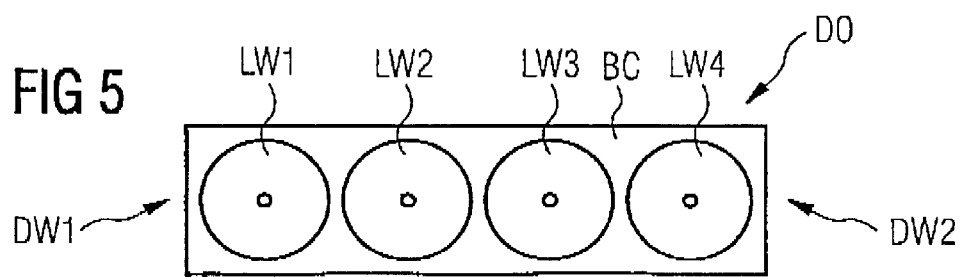

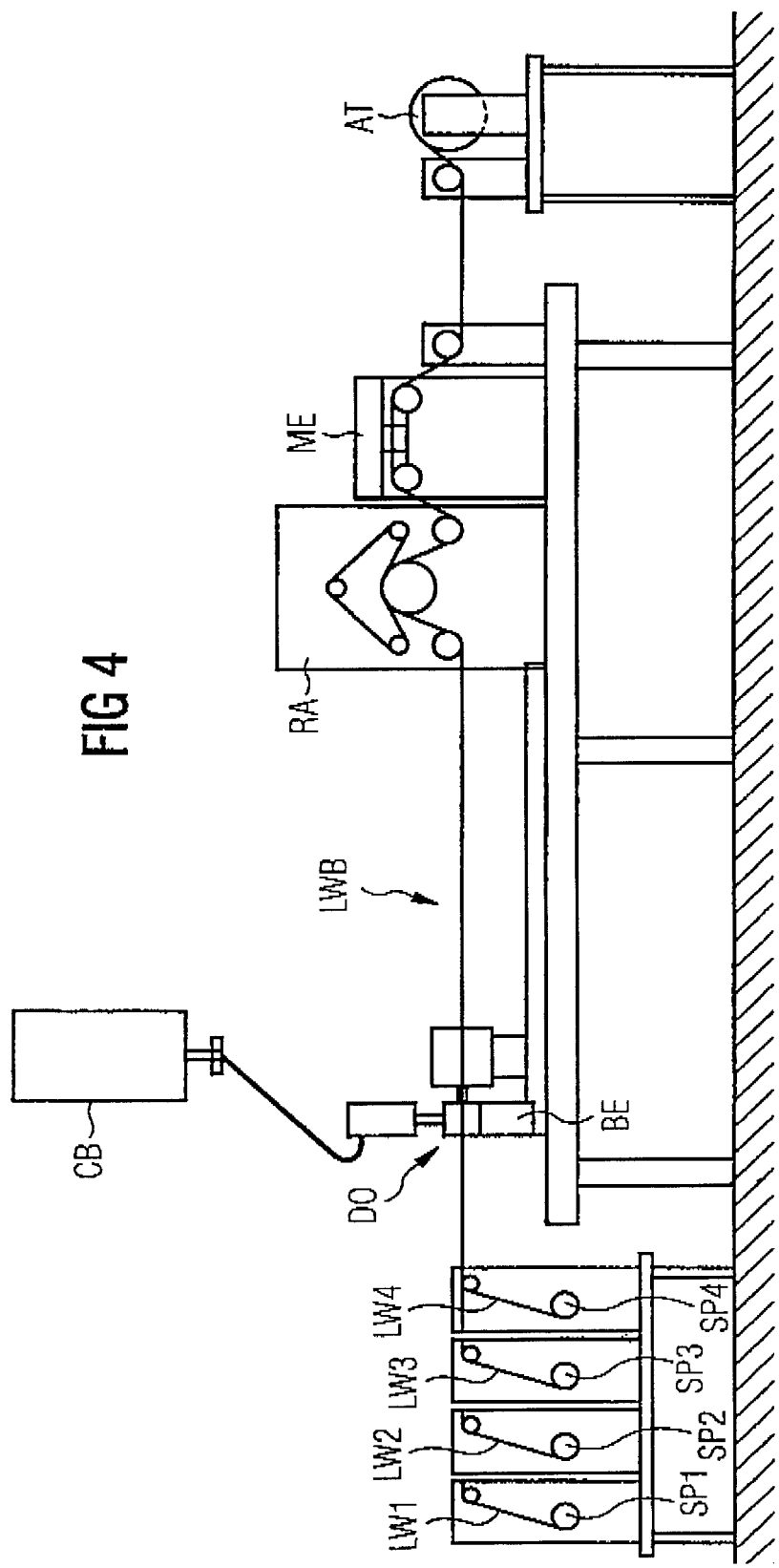

PROCESS FOR MANUFACTURE OF AN OPTICAL RIBBON CONDUCTOR FROM SEVERAL OPTICAL CONDUCTORS

FIELD OF THE INVENTION

The current invention concerns a process for the manufacture of an optical ribbon conductor from several optical conductors where the outer circumference of at least one optical conductor is coated with a first coating material, where the optical conductor and at least one other optical conductor are arranged beside each other in the longitudinal direction and formed into a ribbon conductor, so that a gap is created between the two adjacent optical conductors which is not occupied by an optical conductor, and where the optical conductors are coated with a second coating material so that the ribbon conductor is surrounded by the second coating material and the gap between the two optical conductors is filled by the second coating material.

BACKGROUND OF THE INVENTION

During the manufacture of optical conductors it is customary to characterize them with a color-coded coating in order to determine their type and/or use at a later time. For this purpose, the outer circumference of the optical conductor to be characterized is coated with a colored coating material. In order to form several optical conductors into a ribbon conductor during a further processing step, they are arranged beside each other in a longitudinal direction and are coated with second coating material which surrounds the ribbon conductor to be formed.

In order to combine two optical ribbon conductors containing optical conductors after their manufacture, it is necessary to remove the second coating surrounding the ribbon conductor at the ends without removing the colored coating layer beneath it. In this way the optical conductors remain distinguishable. The removal of the second coating surrounding the ribbon conductor in one piece is usually relatively difficult since the two coatings tend to adhere to each other.

The second coating can be removed chemically by means of a solvent. Such a process is generally not environmentally friendly and could be dangerous to the operators. Another method consists in removing the second coating at the ends by thermal means. The coating can be warmed in small sections and then pulled off. The disadvantages of this solution consist in the fact that only relatively small pieces can be removed and the removal must be done with a special tool. Additionally, the colored coating of the optical conductor is removed at the same time which leads to the loss of the characterization of the optical conductor. It is also possible to remove the second coating mechanically. This is generally rather complicated and there is the danger that the colored coating underneath will also be removed.

From EP 0 614 099 A2 it is known to select a coating material for the colored coating and the second coating surrounding the ribbon conductor which contains a part of a dissolving additive, for example, a part of silicone. This reduces the adhesion between the two coatings. Mechanical characteristics are, however, generally worse due to this additive.

A process for the manufacture of an optical ribbon conductor is known from DE 197 02 106 A1. For the manufacture of the ribbon conductor several optical conductors are guided beside each other through the entry of a coating device. The diameters of the optical conductors and/or the position of the optical conductors within the ribbon conductor are determined. The width of the entry opening of the coating device can be changed based on the measured diameter values and/or the size of the gap between two optical conductors. Due to the drag flow of the coating material the spaces between or at the optical conductors are completely filled with the coating material. With optimum centering the optical conductors are directly adjacent to each other.

The optical conductors generally have a predetermined nominal outer diameter. In practice, however, there are deviations in diameter for each optical conductor so that the optical conductors generally show over or under tolerance. Due to diameter values that are too small, a gap can form between to adjacent optical conductors, which is not occupied by an optical conductor. This can be caused by the fact the drag flow forces are no longer strong enough to ensure a completely centered arrangement of the optical conductors.

If the gap shows a certain width, the second coating surrounding the ribbon conductor cannot be completely removed since the second coating material in the space between the optical conductors or in the gap, respectively, does not break up.

SUMMARY OF THE INVENTION

The objective of the current invention is to provide a process for the manufacture of an optical ribbon conductor with several optical conductors of a type mentioned in the introduction, which makes it possible to remove the second coating after manufacture in a manner that leaves the coating material underneath.

This objective is achieved by a process for the manufacture of an optical ribbon conductor with several optical conductors of the type mentioned in the introduction, where the position of an optical conductor within the ribbon conductor is controlled by the coating thickness of the second coating material.

By controlling the position of an optical conductor within the ribbon conductor relative to the coating thickness of the second coating material, the width of the gap not occupied by an optical conductor between two adjacent optical conductors is influenced relative to the coating thickness. A gap width results which is relative to the coating thickness. Thus the influence of the coating thickness of the second coating material can be considered for the later removal of the second coating material. The gap width can be measured in such a way, that the second coating material in the space or gap, respectively, between two adjacent optical conductors will be broken during subsequent removal of the second coating material. This makes it possible to remove the second coating material without removing the underlying first coating, for example, a color coating for characterization of an optical conductor.

In further development of the process according to the invention, the position of at least one optical conductor within the ribbon conductor is controlled by the tensile modulus and shear modulus of the second coating material. This has the advantage of considering the individual characteristics of the second coating material during the manufacture of the ribbon conductor, so that the second coating material can be successfully removed after manufacture.

For a preferred version of the process according to the invention, the first coating material is cured, before the second coating material is applied. This is generally done by lamps, which emit UV rays. The UV output of the lamps should be sufficient to cure the first coating material, which, for example, forms the colored coating of the optical conductor. The curing should be done in a nitrogen atmosphere, which has a relatively small oxygen content. The desired oxygen content is 1 to 20 particles per million (ppm). In case the first coating material is not sufficiently cured, the second coating material generally adheres relatively tightly to the first coating material so that the removal of the second coating material becomes more difficult.

In order to keep the gap not occupied by optical conductors as small as possible, or, respectively, to maintain a nominal gap width, it is preferred to optimize the process for applying the first coating material, for example, a coloring process. In this way, diameter deviations of the optical conductors can be reduced during the coloring process. This can be achieved by coating the optical conductors with the first coating material in such a way that a coating thickness between 6 and 9 micrometers ($\mu$m) results. This can be achieved by the proper selection of the coloring die of the coating tool.

In further development of the process according to this invention, the first coating material and/or the second coating material is selected in such a way, that the tensile strength of the second coating material is greater than the adhesion strength between the first and second coating material. A relatively elastic second coating material with a relatively high tensile strength enables the simple removal of the second coating material without the first coating material remaining on the second coating material.

BRIEF DESCRIPTION OF THE DRAWINGS

Having thus described the invention in general terms, reference will now be made to the accompanying drawings, which are not necessarily drawn to scale, and wherein:

FIG. 1 is a cross-sectional view of a construction sample of an optical ribbon conductor with several optical conductors;

FIG. 2 is a schematic illustration of the ribbon conductor during removal of the surrounding second coating;

FIG. 3 is a sectional view of the surrounding second coating;

FIG. 4 is a functional illustration of a sample of a production line; and

FIG. 5 is a cross-sectional view of an entry opening of the coating device according to FIG. 4.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 shows a cross-section of a construction sample of an optical ribbon conductor LWB, which in this sample contains four optical conductors LW1 to LW4. The optical conductors LW1 to LW4 show a longitudinal direction along their optical axis OA. The optical conductors LW1 to LW4 in this sample could be optical fibers or optical cables containing several optical fibers arranged within. The optical conductors LW1 to LW4 are arranged in their longitudinal direction beside each other in such a way, that they are positioned parallel to each other on a common level.

The optical conductors LW1 to LW4 are coated with a first coating material FC which serves for the characterization of the optical conductors LW1 to LW4 in this sample. The first coating material FC is therefore designated as color coating. In this construction sample all optical conductors LW1 to LW4 are provided with the color coating FC.

The ribbon conductor LWB additionally shows a gap S between the optical conductors LW2 and LW3. This gap S or, respectively, the space near the gap S is not occupied by optical conductors. The gap S can, for example, come into existence because the diameters of the optical conductors LW2 and LW3 deviate from the nominal diameter. A nominal diameter of the optical conductors LW1 to LW4 is, for example, 260 $\mu$m, with a tolerance in practice of typically 5 $\mu$m. If the optical ribbon conductor LWB contains, for example, 12 optical conductors, a total tolerance area of 60 $\mu$m can result.

The optical conductors LW1 to LW4 are also coated with a second coating material BC, which completely surrounds the ribbon conductor LWB. The second coating material BC is also designated as the so-called ribbon coating. The spaces between two adjacent optical conductors along with the gap S are therefore filled with ribbon coating.

FIG. 2 shows a schematic illustration where the upper part of the ribbon coating BC is removed in the upward direction. The second coating material BC, which forms the ribbon coating has a tensile modulus E and a shear modulus G. In order to remove the ribbon coating BC from the color coating FC, the force F has to be greater than the adhesion force between the ribbon coating BC and the color coating FC. For the force F the following equation is generally valid:

$$F=eEA,$$

whereby e designates the elongation of the ribbon coating BC, E designates the tensile modulus of the ribbon coating BC, and A designates a cross-sectional area in relationship to the coating thickness of the ribbon coating BC.

FIG. 3 shows a section of the ribbon coating BC from FIG. 2. Gap S shows a gap width sb. The ribbon coating BC shows a smaller coating thickness D, which is measured between a horizontal tangent of one of the optical conductors LW1 to LW4 and the outer limit of the ribbon coating BC. In order to be able to remove the ribbon coating BC completely from the color coating FC, the condition $$E \cdot sb < 2 \cdot D \cdot G$$

$$sb < 2 \cdot D \cdot G/E$$

has to be fulfilled. For a ribbon coating BC which usually consists of an acrylic matrix material, this equation can be simplified by the approximation $$E=3G$$

to the equation $$sb=\tfrac{2}{3}D.$$

This means, in order to ensure the removability of the ribbon coating BC, the gap width sb must have a lower value than $\tfrac{2}{3}$ D.

In summary, it can be said that for the manufacture of the ribbon conductor LWB, the position of at least one of the optical conductors LW2 or LW3 from FIG. 1 has to be controlled within the ribbon conductor LWB in relationship to the coating thickness D of the ribbon coating BC so that a gap width conforming to the above condition results. The gap width sb has to have a value below the value which is dependent on the coating thickness D according to the above simplified equation.

If the above mentioned simplification of the equation is not possible, for example, due to use of another matrix material for the manufacture of ribbon coating BC, the gap width sb is additionally dependent on the tensile modulus E and the shear modulus G. In order to reach the desired gap width sb, the position of at least one of the optical conductors LW2 or LW3 from FIG. 1 has to be controlled during manufacture within the ribbon conductor LWB relative to the tensile modulus E and the shear modulus G of the ribbon coating. The gap width sb has to fall below the value according to the previously mentioned equation, which was not simplified. According to this equation, the value for the gap width is relative to the tensile modulus E and shear modulus G as well as the coating thickness of the ribbon coating BC.

FIG. 4 shows a functional illustration of a sample production line for the manufacture of a ribbon conductor LWB. The optical conductors LW1 to LW4 are ready spooled onto reels SP1 to SP4. The optical conductors LW1 to LW4 are guided in a parallel arrangement along the longitudinal direction beside each other, according to FIG. 1, to a coating device BE. The optical conductors LW1 to LW4 are already coated with the color coating FC according to FIG. 1. The container CB contains the matrix material which is used to coat the optical conductors LW1 to LW4 in a further processing step. The matrix material in the container CB forms the ribbon coating BC according to FIG. 1. The optical conductors LW1 to LW4 arranged next to each other are coated in the coating device BE with the matrix material in container CB, so that the formed ribbon conductor LWB is completely surrounded with the ribbon coating BC. The ribbon conductor LWB is pulled through the coating device BE by means of a take-up device RA. In the measurement device ME, the width of the gap S is measured. The ribbon conductor LWB is then wound unto drum AT.

For the determination of gap S or, respectively, the gap width sb, a light source is provided in the measurement device ME, as described in DE 197 02 106 A1. The ribbon conductor is completely illuminated by the light source. Opposite the light source, for example, a light diode array is provided. If a gap S is formed in the ribbon conductor LWB, a light signal penetrates through this gap S and reaches a corresponding element of the diode array. The gap width will be tested according to the previously mentioned equation to the coating thickness D. If the equation is violated, a signal is activated which triggers an adjustment process in the coating device BE in relationship to the coating thickness D, so that the gap width sb is changed and the equation is fulfilled.

The position of the optical conductors LW1 to LW4 within the ribbon conductor LWB can, as is also described in DE 197 02 106 A1, be influenced by changing the geometrical measurements of the entry opening DO in the coating device BE. The optical conductors LW1 to LW4 are guided through the entry opening DO in the longitudinal direction. To influence the position of the optical conductors within the ribbon conductor LWB a change in the entry opening DO is made. For this purpose one of the two side walls of the entry opening DO is constructed in a moveable fashion.

FIG. 5 shows a cross-section of a sample entry opening DO. The optical conductors LW1 to LW4 are guided along their longitudinal direction through the entry opening DO and are then coated with the second coating material BC which forms the ribbon coating. To influence the position of one or more optical conductors LW1 to LW4, the side walls DW1 and/or DW2 are moveable. The side walls can be regulated by a signal from the measurement device ME according to FIG. 4.

Such an adjustment process is preferably initiated at the beginning of a manufacturing process for the manufacture of the ribbon conductor LWB and is maintained for manufacture of a charge of ribbon conductors LWB. Within a charge of optical conductors, diameter variations are usually relatively small and the tolerances, respectively, relatively uniform, so that it is not usually necessary to continuously regulate within a charge.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A process for manufacturing an optical ribbon conductor from a plurality of optical conductors comprising:

coating an outer circumference of at least one optical conductor with a first coating material;

arranging a plurality of optical conductors including the at least one coated optical conductor to extend in a longitudinal direction adjacent to each other and to form a ribbon conductor having a gap between the two adjacent optical conductors, including the at least one coated optical conductor, that is unoccupied by an optical conductor; and coating the plurality of optical conductors with a second coating material having a coating thickness so that the ribbon conductor is surrounded by the second coating material and the gap between the two adjacent optical conductors is filled with the second coating material, wherein arranging the plurality of optical conductors comprises controlling a position of at least one of the two adjacent optical conductors within the ribbon conductor relative to the coating thickness of the second coating material.

2. A process according to claim 1 wherein controlling the position of at least one of the two adjacent optical conductors within the ribbon conductor comprises controlling the position of at least one of the two adjacent optical conductors in such a way that a gap width of the gap is less than a value which is dependent on the coating thickness.

3. A process according to claim 1 wherein controlling the position of at least one of the two adjacent optical conductors within the ribbon conductor further comprises controlling the position of at least one of the two adjacent optical conductors within the ribbon conductor relative to the tensile modulus and shear modulus of the second coating material.

4. A process according to claim 3 wherein controlling the position of at least one of the two adjacent optical conductors within the ribbon conductor comprises controlling the position of at least one of the two adjacent optical conductors within the ribbon conductor in such a way that a gap width of the gap is less than a value which is relative to the tensile modulus and the shear modulus of the second coating material.

5. A process according to claim 1 wherein controlling the position of at least one of the two adjacent optical conductors within the ribbon conductor comprises controlling the position of at least one of the two adjacent optical conductors relative to the smallest coating thickness of the second coating material.

6. A process according to claim 1 further comprising curing the first coating material before applying the second coating material.

7. A process according to claim 6 wherein curing the first coating material comprises curing the first coating in an atmosphere with an oxygen content of 1 to 250 particles per million particles.

8. A process according to claim 1 wherein coating the at least one optical conductor with the first coating material comprises coating the at least one optical conductor with the first coating material in such a way that the first coating material has a thickness of between 6 and 9 micrometers.

9. A process according to claim 1 further comprising selecting at least one of the first coating material and the second coating material in such a way that the tensile strength of the second coating material is greater than the adhesion force between the first coating material and the second coating material.

10. A process for manufacturing an optical ribbon conductor from a plurality of optical conductors comprising:

coating an outer circumference of at least one optical conductor with a first coating material;

arranging a plurality of optical conductors including the at least one coated optical conductor to extend in a longitudinal direction adjacent to each other and to form a ribbon conductor having a gap between the two adjacent optical conductors, including the at least one coated optical conductor, that is unoccupied by an optical conductor; and coating the plurality of optical conductors with a second coating material having a coating thickness so that the ribbon conductor is surrounded by the second coating material and the gap between the two adjacent optical conductors is filled with the second coating material, wherein the second coating material has a tensile modulus and a shear modulus, wherein arranging the plurality of optical conductors comprises controlling a position of at least one of the two adjacent optical conductors within the ribbon conductor relative to the tensile modulus and the shear modulus of the second coating material.

11. A process according to claim 10 wherein controlling the position of at least one of the two adjacent optical conductors within the ribbon conductor further comprises controlling the position of at least one of the two adjacent optical conductors within the ribbon conductor relative to the coating thickness of the second coating material.

12. A process according to claim 11 wherein controlling the position of at least one of the two adjacent optical conductors within the ribbon conductor further comprises controlling the position of at least one of the two adjacent optical conductors within the ribbon conductor such that:

$$sb < 2DG/E$$

wherein sb is a gap width of the gap, D is the coating thickness of the second coating material, G is the shear modulus of the second coating material and E is the tensile modulus of the second coating material.

13. A process according to claim 12 wherein coating the plurality of optical conductors with the second coating material comprises coating the plurality of optical conductors with an acrylic matrix material, and wherein controlling the position of at least one of the two adjacent optical conductors within the ribbon conductor further comprises controlling the position of at least one of the two adjacent optical conductors within the ribbon conductor such that $sb < 2D/3$.

* * * * *